United States Patent [19]
van der Lely et al.

[11] Patent Number: 5,000,720
[45] Date of Patent: Mar. 19, 1991

[54] SHEAR PIN COUPLING

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 256,716

[22] Filed: Apr. 23, 1981

Related U.S. Application Data

[60] Continuation-in-part of Ser. No. 74,545, Sep. 11, 1979, Pat. No. 4,315,418, which is a division of Ser. No. 872,545, Jan. 26, 1978, Pat. No. 4,199,963.

[30] Foreign Application Priority Data

Apr. 28, 1980 [NL] Netherlands .......................... 8002469

[51] Int. Cl.$^5$ .............................................. F16D 9/00
[52] U.S. Cl. .................................... 464/33; 192/56 R; 277/166
[58] Field of Search .................. 464/33, 32, 43, 44; 192/56 R; 277/166, 188 R, 237, DIG. 4

[56] References Cited

U.S. PATENT DOCUMENTS

| | | | |
|---|---|---|---|
| 3,000,577 | 9/1961 | Ferguson | 464/33 X |
| 3,022,097 | 2/1962 | Seniff et al. | 277/DIG. 4 |
| 3,246,483 | 4/1966 | Schmitter | 464/33 |
| 4,181,313 | 1/1980 | Hillier et al. | 277/166 |
| 4,185,477 | 1/1980 | van der Lely et al. | 464/33 X |
| 4,199,963 | 4/1980 | van der Lely et al. | 464/33 |
| 4,206,931 | 6/1980 | Tomita et al. | 277/166 |
| 4,291,864 | 9/1981 | Reynolds | 192/56 R X |
| 4,292,819 | 10/1981 | van der Lely et al. | 464/33 |
| 4,315,418 | 2/1982 | van der Lely et al. | 464/33 |
| 4,318,284 | 3/1982 | van der Lely et al. | 464/33 |

FOREIGN PATENT DOCUMENTS

| 1947485 | 10/1970 | Fed. Rep. of Germany ...... 277/166 |
|---|---|---|
| 2378978 | 8/1978 | France . |

*Primary Examiner*—Daniel P. Stodola
*Attorney, Agent, or Firm*—Penrose L. Albright

[57] ABSTRACT

A shear pin coupling between two members has shear pins accommodated in a holder which is releasably mounted on a coupling member. The pins extend through holes in a supporting flange ring which is a component of the member. Resilient packing is positioned between the ring and the holder to prevent penetration of dirt to the pins. The resilience of the packing allows the holder to be tilted outwardly out of contact with an abutment surface of the member to allow removal of the holder.

19 Claims, 2 Drawing Sheets

SHEAR PIN COUPLING

RELATED APPLICATIONS

This is a continuation-in-part of application Ser. No. 74,545 filed Sept. 11, 1979 and issued as U. S. Pat. No. 4,315,418, Feb. 16, 1982, which is a divisional application of application Ser. No. 872,545 filed Jan. 26, 1978, and issued as U. S. Pat. No. 4,199,963, Apr. 29, 1980.

SUMMARY OF THE INVENTION

This invention relates to a shear pin coupling particularly, although not exclusively for use in a drive shaft of a vessel, a vehicle or an implement.

According to the present invention there is provided a shear pin coupling comprising a holder in which a shear pin is movably arranged, the holder being releasably mounted on the rest of the coupling, resilient packing being disposed between the holder and a support member having a hole for receiving the shear pin, the packing providing a seal arranged around the shear pin and between the holder and the support member to resist penetration of dirt to the shear pin.

By avoiding soiling of the shear pin, its satisfactory movement is made more reliable so that satisfactory operation of the coupling will not be hindered in circumstances in which the coupling is exposed to soiling, for example, when used in agricultural implements.

In a preferred embodiment, the resilient packing is in contact with one region of the holder and an opposite region of the holder engages an abutment surface of a member rigidly connected with a coupling part. This construction enables mounting and removal of the holder, and the manufacture of the coupling, to be simplified, since the holder can fit with some clearance between the support member and the abutment surface without adverse effect on the operation of the coupling.

The packing may be made from spongy material.

For a better understanding of the present invention and to show how the same may be carried into effect, reference will now be made by way of example to the accompanying drawings, in which:

DESCRIPTION OF THE PREFERRED EMBODIMENT

The shear pin coupling shown in the Figures is incorporated in a drive shaft 34 for transmitting drive between a tractor and an agricultural implement. It should be noted, however, that the shear pin coupling to be described could also be employed in other kinds of drive.

Figure 1:
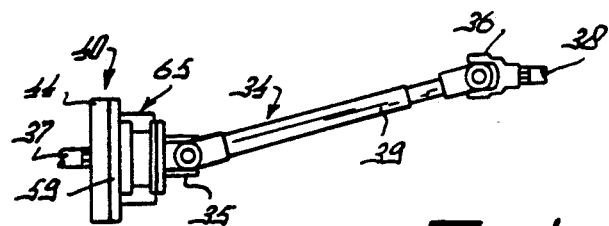
FIG. 1 shows a drive shaft provided with a shear pin coupling.

As shown in FIG. 1, the drive shaft 34 includes two universal joints 35 and 36, by means of which two end shaft parts 37 and 38 of the drive shaft are connected to an intermediate part 39. The shear pin coupling 40 is incorporated in shaft therefor part 37. Although the shear pin coupling is described as being in a drive shaft having a variable form, it could equally well be employed in a rigid, straight drive shaft of a machine or an implement. The coupling can also be used in a drive shaft of a vehicle or a vessel, in which driven wheels or a screw respectively are connected by the drive shaft with a driving engine.

Shaft part 37 (FIG. 2) has axial splines engaging splines provided in a bore of a coupling part 42, which is coaxial with the shaft part 37, the common center line being indicated at 43. The coupling part 42 comprises a flange 44 and a hub 45 extending inside a second coupling part 46. The flange 44 and the hub 45 are integral with one another, and the hub 45 has a plurality of cylindrical bores 47 (for example, three). Each bore 47 accommodates a hardened steel ball 49 which is retained by a bolt 50 in one or more semi-cylindrical notches 48 in the splines 41 of the shaft part 37. This retains the shaft part 37 axially with respect to the coupling part 42.

Near its circumference, the flange 44 has a plurality of recesses 51 to 54 (FIGS. 2, 3, 4) in its axial end face directed towards the part 46. The recesses 51 to 54 are located near one another and merge one into the other. From FIGS. 3 and 4 it can be appreciated that the recesses 51 and 52 are cylindrical, their centerlines 55 and 56 being parallel to the centerline 43. The distance between the centerlines 55 and 56 exceeds the diameter of either of the recesses 51 or 52. The diameters of the recesses 51 and 52 are equal to one another in this embodiment. Between the recesses 51 and 52 there is a recess 53 which is bounded by a plane perpendicular to the centerline 43 and is located in this embodiment nearer to the boundary face 57 of the flange 44 (FIG. 4) than are the circular bottom surfaces of the cylindrical recesses 51 and 52. This boundary face of the recess 53 terminates at two ends in the cylindrical recesses 51 and 52. The recess 53 is located between the recesses 51 and 52. A boundary face of the recess 53 parallel to which the centerline 43 runs parallel is located, as shown in FIG. 3, slightly nearer to the centerline 43 than the line of connection between the centerlines 55 and 56.

The recesses 51, 52 and 53 all open into the fourth recess 54, which is generally in the shape of a V and extends throughout the thickness of the flange 44. The tip of the V-shaped recess 54 is rounded, and is located in a radial plane passing midway between the centerlines 55 and 56, and the two faces of the recess 54, viewed towards the outer circumference of the flange 44, diverge from each other symmetrically about that plane. The outer ends of the faces of the V-shaped recess 54 are spaced apart by a distance which is substantially equal to or slightly larger than the distance between the centerlines 55 and 56. The coupling part 46, is coaxial with the hub 45 of the coupling part 42 (FIG. 2), and these parts are mounted one on the other by means of a needle bearing 58, which surrounds the hub 45. The coupling part 46 furthermore has a hardened steel flange 59, one of the axial end faces of which contacts the boundary face 57 of the flange 44 of the coupling part 42. The flange 59 is fastened by bolts 60 in the coupling part 46 to the rest of the coupling part 46. The flange 59 has two rows of holes 61 which are parallel to the centerline 43. The centerlines of the holes 61 are all the same distance from the centerline 43. In this embodiment one of the rows has five holes, the center-to-centre distance between said holes being about 30% larger than the diameter of one of the holes of said row. The other row of holes in this embodiment also has five holes on the diametrically opposite side of the coupling part 46. The holes 61 may all have the same diameter, but there may, as an alternative, be three groups of holes, the holes of each group having diameters differing from the holes of the other two groups.

Between the flange 59 and a face 80 of a body 81 of the coupling part 46 there is resilient packing 82. The packing 82 is made from a spongy material of synthetic resin of closed cell structure. The outer circumference 83 of the body 81 has a diameter corresponding with the diameter of the flange 59. The body 81 has depressions 85 bounded by arcuate surfaces 84 which are considerably nearer to the centerline 43 than is the other circumfernece 83. The depressions 85 accommodate shear pin holders 65. The packing 82 is clamped tight between the flange 59 and the face 80, but in the area of the depressions 85 it is left uncovered by the face 80. The packing 82 has holes 86 aligned with the holes 61 in the flange 59.

All of the holes 61 in the flange 59 receive hardened steel shear pins 62, each of which is a close fit in its respective hole 61. If, for example, the holes 61 have three different diameters, the shear pins 62 used will have three corresponding different diameters. Although reference is made here to diameters of shear pins, implying cylindrical pins, it will be obvious that other cross-sectional shapes for the shear pins may be employed, for example, square or hexagonal pins. The holes 61 will match the shapes of the shear pins.

The distance of the centerline of each hole 61 from the centerline 43 is the same for all of the holes, and corresponds to the distance of the centerline 43 from a centerline indicated in FIG. 3 by the point 63. Point 63 is located near the rounded-off tip of the V-shaped recess 54 in the flange 44.

All of the shear pins 62 are pressed home from the side of the flange 59 away from the flange 44 by a springloaded plunger 64 arranged in a holder 65 disposed between the flange 59 and a flange 66 of the coupling part 46. The holder 65 has holes 87 through which extend the shear pins 62. The holes 87 are preferably larger than the pins 62, as in this embodiment, and their shapes preferably match the cross-sections of shear pins 62. The shapes of the holes 86 in the packing 82 preferably also match the cross-sections of shear pins 62 and their size is at the least equal to that of the holes 61, but preferably they are slightly larger. The packing is such that it fills the space between the flange 59 and the holder 65 and preferably it is slightly compressed between the flange 59 and the holder 65. The holes 61 of each of the two rows of holes 61 open into a respective holder 65. Each holder 65 of this embodiment has five adjacent plungers 64, which are slidable in directions parallel to the centerline 43 in the holder 65 under the action of a respective spring 67. Each spring 67 is retained at one end in a cavity 89 of a locking cap 88 which is rigidly fixed to the holder 65. The holder 65 is fitted between the flange 59 and the flange 66 with the caps 88 engaging an abutment surface 91 of the flange 66 at a small edge region 91 as will be apparent from FIG. 2. The holders 65 are each fixed in place by a resilient spring-steel clamp 68 which can pivot about one of the bolts 60. Each clamp 68 can be readily released by hand so that the holder 65 concerned can be removed by lifting the end of the holder nearer the flange 66 and then removing the entire holder 65 from its depression 85. To allow this removal the diameters of the holes 87 located at the end of the holder 65 which faces the flange 59 are materially larger than those of the shear pins 62 which pass through these holes. Furthermore, the holder 65 is located with some clearance between the flanges 59 and 66.

During operation, the ends of all but one of the shear pins 62 are in contact with the boundary face 57 of the flange 44. That one of the shear pins 62 (which may be any one of them) projects from the flange 59 and engages the boundary face of the recess 53 at right angles to the center line 43 in the flange 44.

Figure 2:
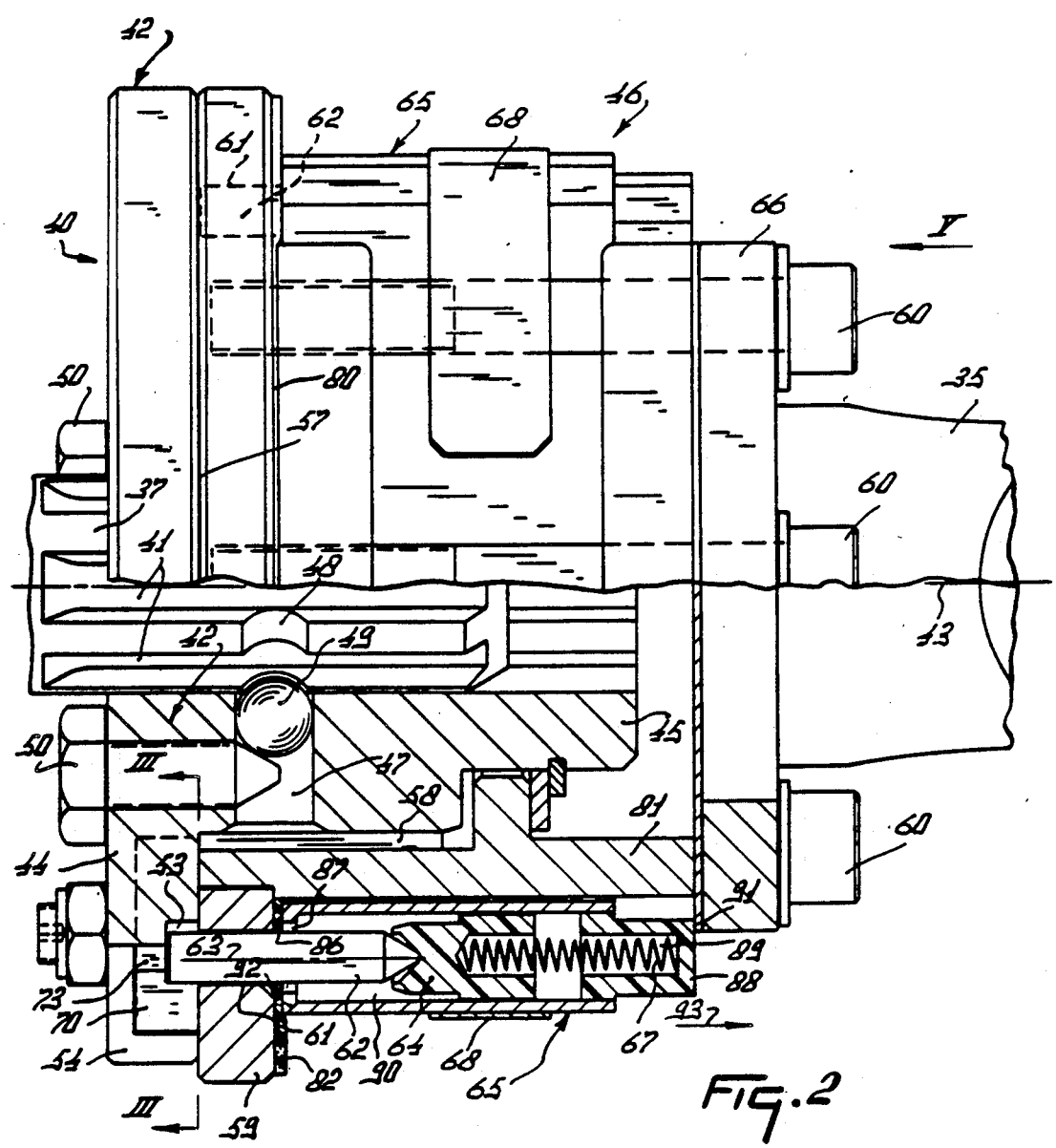
FIG. 2 is a partly sectional view of the coupling of FIG. 1.
Figure 3:
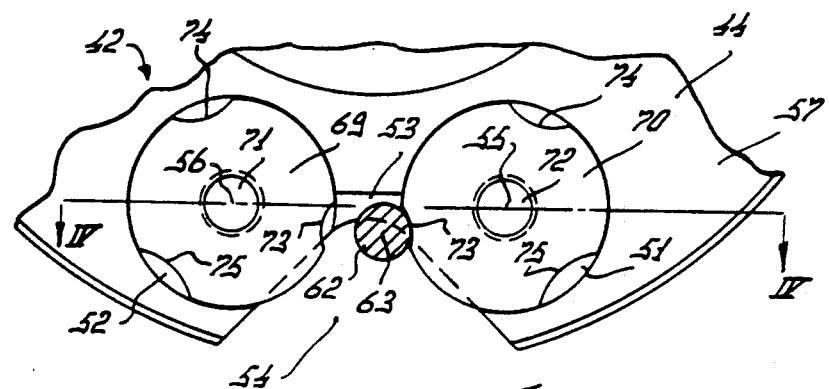
FIG. 3 is a sectional view taken on the line III—III in FIG. 2.
Figure 4:
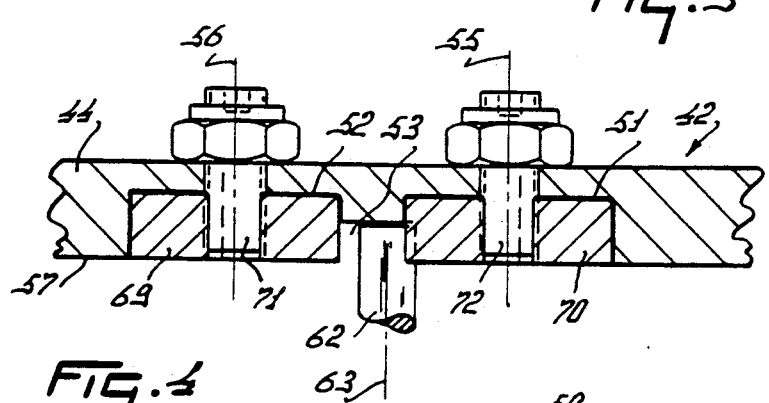
FIG. 4 is a sectional view taken on the line IV—IV in FIG. 3.
Figure 5:
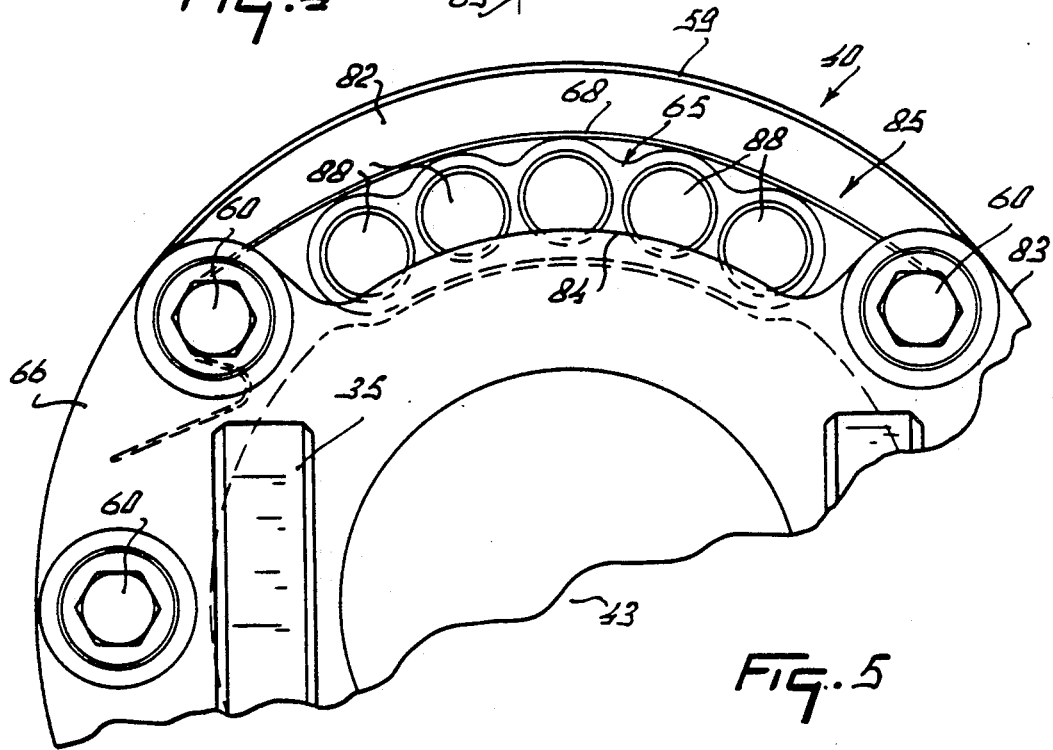
FIG. 5 is a view taken in the direction of the arrow V in FIG. 2.

Each of the two recesses 51 and 52 in the flange 44 contains a substantially cylindrical cutting element 69 and 70 respectively (FIGS. 2 and 3). The cutting elements 69 and 70 are rotatable in their recesses 51 and 52. Each of the two cutting elements 69 and 70 is fastened to the flange 44 by a respective bolt 71 and 72. The cylindrical boundary of each cutting element 69 and 70 has in this embodiment, three cavities 73, 74, 75. Each cavity is bounded by an arcuate surface which corresponds to a given diameter of shear pin 62, so that the cutting elements 69, 70 can be used for shear pins of different diameters. After slightly loosening the bolts 71 and 72, the cutting element concerned can be turned in order to bring the desired cavity 73, 74 or 75 into position for co-operation with the shear pin of the corresponding diameter. Consequently, the driving torque to be transferred by the drive shaft 34 is passed, for example, via the cutting element 70 and the shear pin 62 located in its cavity 73, from the flange 44 of the coupling part 42 to the coupling part 46 and to the device to be driven. The periphery of the hole 61 in the flange 59 constitutes a contact surface for the shear pin to transmit the forces to the coupling part 46, of which the flange 59 is a part. When overload occurs, for example due to obstruction of the device to be driven, the portion of the shear pin 62 in contact with the boundary surface of the cavity 73 of the cutting element 70 breaks off so that the coupling parts 42 and 46 can rotate relatively to one another without the risk of damage of other parts of the shaft. While the flanges 44 and 59 rotate one over the other after overload, these flanges can support one another to resist bending moments exerted by the coupling parts on one another. An axial shift of the coupling parts 42 and 46 is prevented by the balls 49 located in the bores 47 and in the notches 48 of the splines 41.

The broken-off piece of the overloaded shear pin 62 can escape through the space formed by the recess 54 in the flange 44 and it is usually flung out of the coupling.

When the driven shaft 37 continues to rotate at its normal operational speed neither the remaining part of the broken shear pin 62, nor any of the other shear pins 62, will be able to move between the two cutting elements 69 and 70 so as to engage the boundary face of the recess 53. This feature is a result of the dimensions of the construction as shown in FIG. 3. Because of this, the operator's attention will usually be drawn to the overload so that he can take steps to eliminate the cause of the overload. In order to allow a further shear pin 62, or the remaining part of the broken shear pin 62, to get in between the cutting elements 69 and 70, the speed of the driving engine has to be intentionally reduced to a low or very low value. When the new shear pin 62 or the remaining part of the broken shear pin is again in contact with the boundary face of the recess 53, the speed can again by raised to the normal operational value. The now operative shear pin can be any one of the ten pins of this embodiment, but it cannot be predicted which shear pin it will be.

When the drive changes its direction of rotation, as may occur in vehicles and vessels, machine tools and the like, the shear pin 62 moves from one of the cutting elements 69, 70 to the other. Therefore, this automatic shear pin coupling can be used for either direction of rotation.

The packing 82 seals the space between the flange 59 and the end 92 of the holder 65. The packing is in contact with the holders 65 and the holes 86 are aligned with the holes 87. Thus the space 90 and the space between the pin 62 and the circumference of the hole 87 is closed. Therefore, dirt cannot accummulate around the pins 62 between the flange 59 and the holder 65 and/or in the space 90 or the hole 87 so that the movement of the pins 62 under the action of the plungers 64 will not be hindered. The sealing cap 88 arranged on the holder 65 closes the space 90 at the end away from the end 92. Consequently, the operation of the spring 67 and of the plunger 64 will not be hindered by dirt. The operation of the shear pin coupling is thus satisfactorily protected against dirt, which is particularly important when the coupling is employed in, for example, agricultural machines for working the soil, field crops or for harvesting the crop. In the region of the depressions 85, the packing 82 is fastened to the flange 59, for example by adhesion. The packing 82 is preferably bonded over an area extending beyond the circle centered on the centerline 43 and containing the holes 61. The packing 82 can be readily bonded to the flange by means of a double-sided adhesive strip, which is first stuck to the flange, after which the packing is applied to the adhesive strip. The adhesive strip is supplied with backing paper or foil on its two surfaces, which can be peeled off to stick the strip to the flange and to stick the packing thereto.

The removal of shear pins 62 and their replacement by new pins can be readily carried out by releasing the clamps 68, tilting the holders out from abutment surface 91, and removing the holders 65 in the direction of the arrow 93. When the holder 65 is tilted over, it compresses the resilient packing 82, which facilitates the removal of the holder from between the flange 59 and the supporting area of abutment surface 91. Consequently the resilient packing permits of arranging the holder with a given amount of clearance between the flange 59 and abutment surface 91 so that mounting and dismounting are facilitated. The shear pins can then be taken out of the holes 61 or be inserted into them. The holders 65 can then be replaced in the reverse order of operations.

While various features of the coupling described and illustrated in the drawings, are set forth in the following claims as inventive features, it is to be noted that the invention is not necessarily limited to these features and may encompass other inventive features disclosed both individually and in various combinations.

We claim:

1. An overload coupling comprising coupling members that are interconnected to one another by at least one shear pin, said pin being housed in a holder that is releasably mounted on one of said members, a resilient packing being positioned between said holder and said one member, said packing as positioned being capable of resilient compression to facilitate removal of said holder, said one member having a hole that slideably receives said pin and said packing affording a seal for the pin so that penetration of dirt into the pin interfit and holder is prevented.

2. A shear pin coupling as claimed in claim 1, in which said packing contacts one part of said holder and an opposite holder part contacts an abutment surface of said one member.

3. A shear pin coupling as claimed in claim 2, in which said holder is tiltable against the resilience of said packing when released from the abutment surface of said one member.

4. A shear pin coupling as claimed in claim 1, in which the packing is affixed at least in part to a support flange member of said one member.

5. A shear pin coupling as claimed in claim 4, in which at least one portion of said packing is clamped tight between the support flange member and a further part of said coupling.

6. A shear pin coupling as claimed in claim 1, in which the packing is configured in the form of a ring and has a plurality of holes through which extend a plurality of shear pins that are housed in said holder.

7. A shear pin coupling as claimed in claim 6, in which there are two holders mounted on said one member and the packing extends between said holders, said holders being positioned diametrically opposite one another on a circular flange of said one member.

8. A shear pin coupling as claimed in claim 1, in which the packing is made from a material having a closed cell sponge structure.

9. An overload coupling comprising two coupling members that are interconnected to one another by at least one shear pin to rotate about a common axis, said pin being housed in a holder that is releasably mounted on an outer periphery of one of said members and adjacent a circular flange of said one member, a resilient packing being positioned between said holder and said flange, said flange having a hole that receives said pin and said pin extending through the packing and said hole into a part of the other said member to provide said interconnection between said coupling members, said packing having an opening receiving said pin and affording a seal for said pin and said holder to prevent dirt penetration into the flange hole and said holder, said packing being resiliently compressed between said flange and one end of said holder and using the opposite end of said holder into abutment against a surface on said one member remote from said flange to assist in retaining said holder in place, the resilience of said packing being of such nature that it can be further compressed to facilitate removal of the holder from between said packing and said surface.

10. A coupling as claimed in claim 9 comprising a coupling part body adjacent said flange at a location spaced from said pin, said packing being clamped tightly between said body and said flange.

11. A coupling as claimed in claim 9 wherein the size of said hole is at least equal to the size of said opening receiving said pin.

12. A coupling as claimed in claim 9 wherein said holder contains spring means which resiliently urges said pin from said holder towards said hole.

13. An overload coupling comprising coupling members that are interconnected to one another by at least one shear pin, said pin being housed in a holder that is releasably mounted on one of said members, a resilient packing being positioned between said holder and said one member, said one member having a hole that slidably receives said pin and said packing affording a seal for the pin so that penetration of dirt into the pin interfit and holder is prevented, said packing being affixed to said one member over an area extending beyond and containing said hole.

14. A coupling as claimed in claim 13 wherein said packing is not affixed to said holder.

15. A coupling as claimed in claim 14 wherein said one member comprises a coupling part body at a location spaced from said pin and adjacent a further part of said one member, said packing being clamped tightly between said body and said adjacent part to affix said packing to said one member.

16. A coupling as claimed in claim 15 wherein said packing is capable of resilient deformation for removal of said holder.

17. A coupling as claimed in claim 13 wherein said holder is received between said packing and a surface on said one member and said packing is resiliently compressed between said one member and said holder to assist in retaining said holder in place, said packing being capable of further compression to facilitate removal of said holder from between said packing and said surface.

18. A coupling as claimed in claim 17 wherein said packing extends in part outboard of said holder where it is not compressed.

19. A coupling as claimed in claim 18 wherein said one member comprises means for clamping said packing tightly thereto at a location spaced from said pin.

* * * * *